(12) United States Patent
Jin et al.

(10) Patent No.: US 12,346,893 B2
(45) Date of Patent: Jul. 1, 2025

(54) METHODS, DEVICES, AND SYSTEMS FOR CREATING AND MANAGING WEB3 APP CREDENTIALS

(71) Applicant: RAMPER LABS, LLC, Kingstown (VC)

(72) Inventors: Karl Jin, Keene, NH (US); Hoa Mai, Palo Alto, CA (US); Sisun Lee, Los Angeles, CA (US); Vinh The Nguyen, Ho Chi Minh (VN); Thanh Le, Ho Chi Minh (VN)

(73) Assignee: RAMPER LABS, LLC, Kingstown (VC)

( * ) Notice: Subject to any disclaimer, the term of this patent is extended or adjusted under 35 U.S.C. 154(b) by 189 days.

(21) Appl. No.: 18/199,145

(22) Filed: May 18, 2023

(65) Prior Publication Data

US 2023/0376941 A1 Nov. 23, 2023

Related U.S. Application Data

(60) Provisional application No. 63/343,921, filed on May 19, 2022.

(51) Int. Cl.
| | |
|---|---|
| *G06Q 20/36* | (2012.01) |
| *G06F 21/53* | (2013.01) |
| *G06Q 20/40* | (2012.01) |
| *H04L 9/08* | (2006.01) |

(Continued)

(52) U.S. Cl.
CPC ......... *G06Q 20/3674* (2013.01); *G06F 21/53* (2013.01); *G06Q 20/4014* (2013.01); *H04L 9/0891* (2013.01); *H04L 9/16* (2013.01); *H04L 9/3213* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 10,699,021 B2 | 6/2020 | Oliveira et al. | |
| 11,943,350 B2* | 3/2024 | Liu | H04L 9/3247 |
| 12,062,037 B1* | 8/2024 | Coventry | H04L 9/0825 |

(Continued)

OTHER PUBLICATIONS

Brian Spector, "What is Multi-Party Computation (MPC)?", Jul. 2, 2021 (Year: 2021).*

*Primary Examiner* — Jamie R Kucab
*Assistant Examiner* — Timothy Paul Sax
(74) *Attorney, Agent, or Firm* — Command IP LLP; Pejman Yedidsion

(57) ABSTRACT

Systems, devices, and methods for creating and managing web3 app credentials, including: determining a private key and a public key; encrypting the determined private key into a plurality of separate keys; transmitting the first key to a third party provider; transmitting the second key to a cloud storage device; encrypting the first key and the second key; decrypting the second key; transmitting the decrypted second key; transmitting a transaction sign request to a secure third-party trusted execution environment; performing a user identity verification; transmitting a request to the third party provider for the first key; performing reconstruction of the original private key based on the first key and the second key; and signing a digital wallet transaction based on the reconstructed original private key received from the trusted execution environment.

17 Claims, 10 Drawing Sheets

(51) Int. Cl.
*H04L 9/16* (2006.01)
*H04L 9/32* (2006.01)

(56) References Cited

U.S. PATENT DOCUMENTS

| | | | | |
|---|---|---|---|---|
| 2019/0354972 A1* | 11/2019 | Di Nicola | .......... | G06Q 20/3825 |
| 2020/0111080 A1* | 4/2020 | Metcalfe | ............... | H04L 9/3255 |
| 2021/0051022 A1* | 2/2021 | Jarjoui | ................. | G06Q 20/367 |
| 2021/0143998 A1* | 5/2021 | Kuai | ..................... | H04L 9/3247 |
| 2022/0035932 A1* | 2/2022 | Baldi | .................... | G06F 21/602 |

* cited by examiner

METHODS, DEVICES, AND SYSTEMS FOR CREATING AND MANAGING WEB3 APP CREDENTIALS

CROSS-REFERENCE TO RELATED APPLICATIONS

This application claims priority to and the benefit of U.S. Provisional Patent Application No. 63/343,921, filed May 19, 2022, the contents of which are hereby incorporated by reference herein for all purposes.

TECHNICAL FIELD

Embodiments relate generally to encryption key management, and more particularly to methods of securely creating and managing web3 encryption keys.

BACKGROUND

Over the last decade, communication and communication methods have become a critical part of business, government, and the lives of private citizens alike. As communication continues to become more confined to the digitized world, information such as Personal Identifiable Information (PII), banking information, and details pertaining to financial transactions have become increasingly susceptible to theft, and a multitude of methods including phishing, spoofing, and hacking to name a few.

Blockchain, a digital data store for digital transactions, is used for transactions by over 40 million users and growing. Blockchain is important because businesses and personal users alike run on information. Blockchain is an ideal method for delivering information because it provides immediate, shared, and completely transparent information stored on an immutable ledger that can be accessed only by permissioned network members.

Users who desire to conduct business on blockchain, must first configure their devices to perform transactions and interact with the communication method. This includes determining which decentralized application he/she wishes to use, registering for a wallet, and securing information necessary to access those associated accounts. This process has been cumbersome and time consuming since the steps associated with the entire process have not been centralized to a single entity or location. The decentralization of the steps to, for example, creating a wallet, which essentially maintains account information concerning monetary funds, causes issues of security and continuity. In some cases, users are required to jot down passwords and long-sequence account number information, while in other cases, facilitating applications use insecure practices in managing sensitive information. This process leaves a user and his/her funds exposed to misplacement, theft, mismanagement, and other issues which are problematic.

SUMMARY

The various embodiments of the present disclosure have several features, where no single one of which is solely responsible for their desirable attributes. Without limiting the scope of the present embodiments as expressed by the claims that follow, their more prominent features now will be discussed briefly. After considering this discussion, and particularly after reading the section entitled "Detailed Description," one will understand how the features of the present embodiments provide the advantages described herein.

A system embodiment may include: a user computing device having a processor and addressable memory, the user computing device in communication with a cloud storage device having a processor and addressable memory, a secure third-party trusted execution environment having a processor and addressable memory, and a third-party provider; where the user computing device may be configured to: determine, via a Secure Web Sandbox being executed on the user computing device, a private key and a public key based on receiving a request from a user to create a digital wallet; encrypt the determined private key into a plurality of separate keys, where the plurality of separate keys may be split via encoding the private key into a first key and a second key; transmit the first key to a third party provider; transmit the second key to a cloud storage device; and where the cloud storage device may be configured to: encrypt the second key via cloud encryption-at-rest; store the encrypted second key for future retrieval and decryption; where the third party provider may be a key management system configured to: encrypt the first key via an individualized hardware security module encryption key; and store the encrypted first key for future retrieval and decryption; where the cloud storage device may be further configured to: perform a multi-factor authentication verification based on a received request from the user computing device for the second key; decrypt the second key based on a successful authentication, where the authentication may be determined to be successful by a multi-factor authentication service; transmit the decrypted second key to the user computing device; where the user computing device may be further configured to: transmit a transaction sign request to the trusted execution environment where the request comprises transaction details and the decrypted second key; where the trusted execution environment may be further configured to: perform a user identity verification; transmit, if the user identify verification may be successful, a request to the third party provider for the first key via a secure access; perform reconstruction of the original private key based on the first key received from the third party provider and the second key received from the cloud storage device; sign a digital wallet transaction based on the reconstructed original private key received from the trusted execution environment; and return the signed digital wallet transaction to the user computing device; and where the user computing device may be further configured to: broadcast the signed transaction details, via a decentralized application, to a blockchain.

Additional system embodiments may further include an authentication system configured to provide additional step of authenticating the user as part of the key management system. In additional system embodiments, the third party provider may be further configured to determine a user identity confirmation via the authentication system.

In additional system embodiments, the multi-factor authentication service may be controlled by at least one of: an authentication provider of the authentication system and a third-party entity. In additional system embodiments, each key of the plurality of separate keys may be stored in a different location. In additional system embodiments, the user identity verification may be further performed using an access token associated with the user, where the access token may be a time-limited user access token. In additional system embodiments, the private key may be similar to a password.

In additional system embodiments, the plurality of separate keys may be split via encoding the private key into a first key, a second key, and a third key. In additional system embodiments, the third key may be stored on at least one of: a local device and a different third-party provider. In additional system embodiments, biometric data may be used as further authentication requirements to retrieve the first key and/or the second key.

A method embodiment may include: determining, by a user computing device having a processor and addressable memory, a private key and a public key based on receiving a request from a user to create a digital wallet; encrypting the determined private key into a plurality of separate keys, where the plurality of separate keys may be split via encoding the private key into a first key and a second key; transmitting the first key to a third party provider having a processor and addressable memory; transmitting the second key to a cloud storage device having a processor and addressable memory; encrypting, by the third party provider executing a key management system, the first key; storing the encrypted first key for future retrieval and decryption; encrypting, by the cloud storage device, the second key via cloud encryption-at-rest; storing the encrypted second key for future retrieval and decryption; performing a multi-factor authentication verification based on a received request from the user computing device for the second key; decrypting the second key based on a successful authentication; transmitting the decrypted second key to the user computing device; transmitting, by the user computing device, a transaction sign request to a secure third-party trusted execution environment having a processor and addressable memory, where the request comprises transaction details and the decrypted second key; performing, by the trusted execution environment, a user identity verification; transmitting, if the user identify verification may be successful, a request to the third party provider for the first key; performing reconstruction of the original private key based on the first key received from the third party provider and the second key received from the cloud storage device; signing a digital wallet transaction based on the reconstructed original private key received from the trusted execution environment; returning the signed digital wallet transaction to the user computing device; and broadcasting, by the user computing device, the signed transaction details to a blockchain.

In additional method embodiments, the user computing device may be in communication with the cloud storage device, the secure third-party trusted execution environment, and the third-party provider. Additional method embodiments may include: transmitting, if the user identify verification may be successful, a request to the third party provider for the first key via a secure access.

In additional method embodiments, determining a private key and a public key may be via a Secure Web Sandbox being executed on the user computing device. In additional method embodiments, encrypting the first key may be via an individualized hardware security module encryption key. In additional method embodiments, a successful authentication may be determined to be successful by a multi-factor authentication service. In additional method embodiments, broadcasting the signed transaction details may be via a decentralized application.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
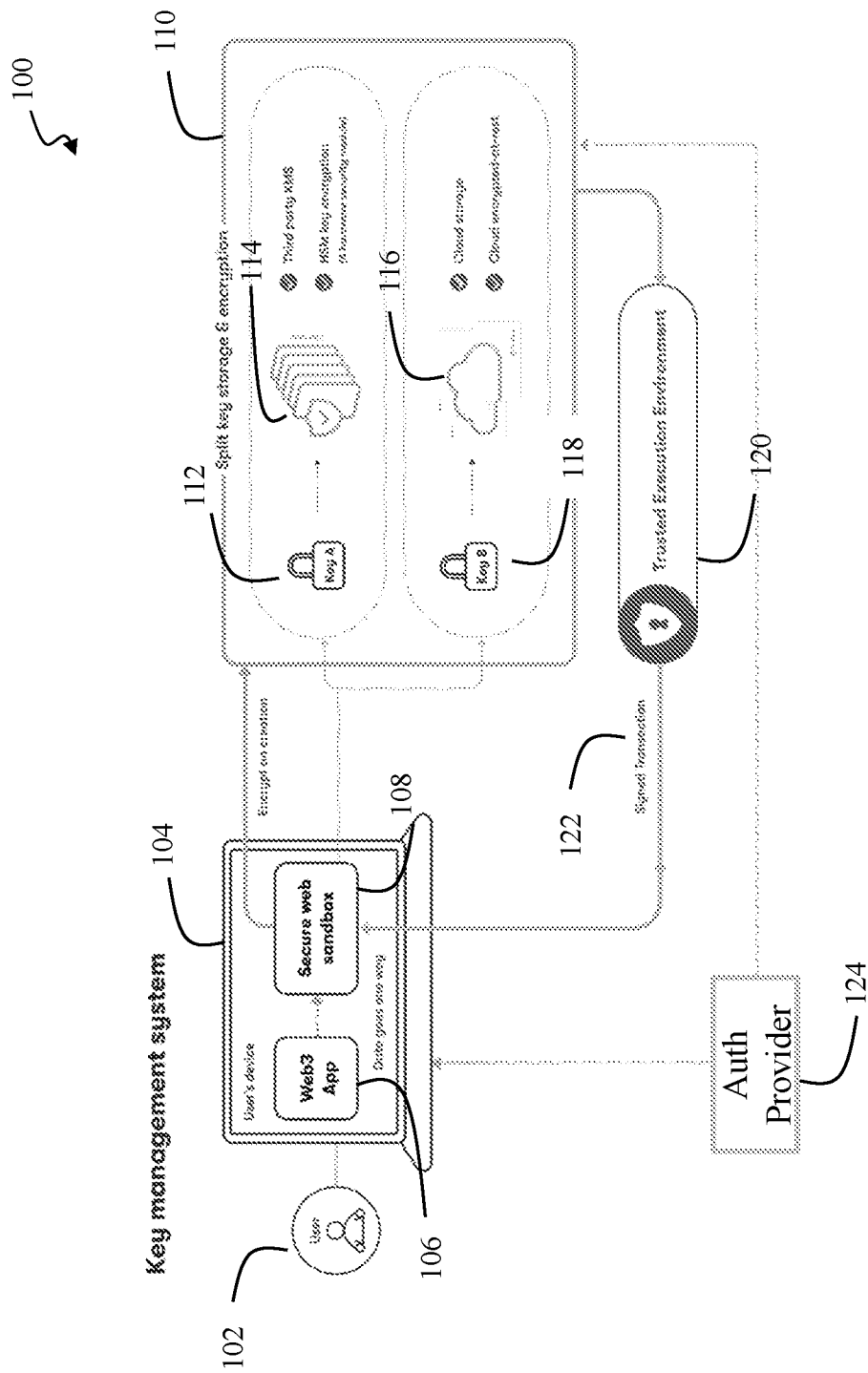
FIG. 1 depicts a top-level functional block diagram of an embodiment of the key management system.

The described technology concerns one or more methods, systems, apparatuses, and mediums storing processor-executable process steps to creating and managing a user's web3 app credentials.

The techniques introduced below may be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The present embodiments, which will be described subsequently in greater detail, provide a key management system that enables seamless wallet sign-in operations at scale while guaranteeing the security of the private wallet keys. To attain this, the present embodiments include a user computing device having a processor and addressable memory, such as a laptop or mobile device capable of performing encryption via a software application, an authorization system connected to the user computing device designed to interface with a user and authenticate a user, a cloud storage device connected to the user computing device which stores encrypted private keys, a third-party Key Management System (KMS) provider which encrypts/decrypts encrypted private key for storage and retrieval, a Multifactor Authentication server, and a third-party Trusted Execution Environment.

When in operation, a method embodiment of the present disclosure for creating a web3 wallet includes the steps of a user being authenticated by the authentication system via their user computing device, the user requesting to create a web3 wallet, a public key and a private key being created by and on the user computing device, the private key being encoded into two separate ciphers, a first cipher being sent to the third party KMS provider, where it is stored and encrypted by an individualized HSM encryption key, and a second cipher being sent to the cloud storage.

Additionally, when in operation, a method embodiment of the present disclosure for signing a web3 wallet transaction may include the steps of: a user being authenticated by the authentication system via his/her user computing device; a first cipher being retrieved from a cloud storage to the user computing device; transaction details data, a second key, and a user access token are sent to a Transaction Sign Function (TSF) where the TSF verifies the user access token and the user identity, fetches a second key, reconstructs the original private key from a first key and a second key, signs the transaction details data with the private key, and returns the signed transaction details data to the user computing device, and then the signed transaction details data is broadcast to the blockchain.

In one aspect of the present embodiments, the authorization system may use familiar authentication methods such as letting a user log in via Face ID or email. In another aspect of the disclosed embodiments, the authorization system may reside on the user computing device in the form of executable software.

The disclosed systems and devices provide a method to create and manage web3 wallet credentials where no exposure of a user's private key, to a facilitating body, is present within the system. Additionally, the disclosed systems and devices provide a method to create and manage web3 wallets directly through a decentralized application (DApp), which precludes the need for a user to create and register a wallet on a platform separate to that which is supported by the disclosed system. Another embodiment provides a seamless and secure wallet creation and management system to web3 wallet users and potential users while allowing for the same user to log into multiple DApps using the same wallet.

A disclosed embodiment of a method for creating and managing user web3 app credentials, may include: prompting, at a local user device session, a user to create a new web3 app wallet; creating a new wallet by generating a public address and private key, corresponding to the newly created web3 app wallet; encoding the private key into two separate ciphers, a first and a second, and storing the private key in a remote storage location; then sending, from the local device, the first cipher to a third-party provider, where it is stored; and sending, from the local device, the second cipher to a cloud storage, where it is encrypted by a key and stored. The method also may include where at least one of the two separate private key ciphers are of the same size as the original private key via the randomized Exclusive OR (XOR) Cipher process. Additionally, the third-party provider may be a Key Management Service (KMS) provider. The method embodiment may also include a step where a first cipher is sent to a third-party provider and encrypted by an individualized Hardware Security Module (HSM) encryption key.

In another disclosed embodiment of a method for securely facilitating a user's signing of a web3 app wallet transaction, the method may include the steps of: authenticating a user; generating, by a third-party service provider, a time-limited user access token; using the local device, retrieving the second cipher from a cloud storage; sending, a set of transaction details, the second cipher, and the time-limited user access token, to a Transaction Sign Function (TSF); receiving a signed transaction details from a Transaction Sign Function (TSF), and broadcasting the signed transaction details to the blockchain.

Blockchain technology provides a secure platform for digital transactions through its immediate, transparent, and immutable information delivery. Typically, engaging with blockchain involves a complex, time-consuming process of device configuration, decentralized application selection, wallet registration, and securing access information. The decentralization of these steps can lead to security and continuity issues, particularly with wallet creation, which manages monetary account information. Web3 wallets are digital wallets designed for interacting with Web3 applications, which are decentralized applications built on blockchain technology which enables users to store and manage their digital assets, such as cryptocurrencies, NFTs, and other digital tokens. Users may need to manually record long-sequence account numbers and passwords, or encounter insecure management practices of sensitive information. This exposes users and their funds to risks such as misplacement, theft, and mismanagement.

In a blockchain environment Decentralized Applications, or DApps, provide services to users just as regular applications do. DApps are applications which operate autonomously through the use of smart contracts that run on a decentralized computing, blockchain system. As DApps are not owned by any one entity, they distribute tokens which represent ownership. Furthermore, as users shift toward more decentralized applications, it is anticipated that direct "onboarding" or registering for the requisite systems to participate in the services DApps provide, is inevitable.

Currently, to use decentralized applications (DApps) new users of the crypto space are forced to take multiple steps away from a desired DApp, just to become eligible to sign up. Often users need to download the right cryptocurrency wallet client (a wallet that allows users to manage different kinds of cryptocurrencies and helps to easily exchange funds as they are cryptographically signed), install supporting browser extensions, store a private key, then deposit cryptocurrency into their wallet through a separate exchange, which they will also need to create an account for.

The disclosed embodiments streamline the onboarding process, where processes are created to automatically store, encrypt, and manage a wallet key while securing a wallet key and not allowing it to be exposed to theft by a proprietary user who may have admin access, for example, to a user wallet key storage bank. Further solutions disclosed involve processes which do not return a user's private or wallet key to a user device during a transaction signing step. Therefore, the process steps do not expose the vital wallet key to a multitude of opportunities of theft.

Accordingly, the disclosed embodiments provide a system to secure wallet key management which does not expose the wallet key to single points-of-failure or other transmission/handling opportunities of third-party theft. The present embodiments disclose implementation of various process and management features which maintain the highest level of wallet key security using multiple encryption and storage servers, splitting a key into multiple encrypted versions, where multiple steps of user authentication are performed by third-parties, and adding decentralized redundancies to the transaction signing process. Further features of the present embodiments also allow a user to sign-in and use a single wallet account on multiple DApps as opposed to creating and managing a multitude of wallets per DApp based on the configuration that does not provide access to the user private key by the DApps, and enabling users to use the same wallet across all the DApps. This feature allows a user and key management system to maintain a more robust security method with less information, while making it scalable and as described further below, utilizing a logical operation that is true if and only if its arguments differ (one is true, the other is false (XOR)) to increase processing speed and reduce processing time by removing complexity of encrypting/decrypting keys. For example, using the XOR Boolean logic operation, the system may compare two input bits and generate one output bit. The logic being executed is that if the bits are the same, the result is 0 and if the bits are different, the result is 1.

The disclosed embodiments provide methods, devices, and systems to streamline the onboarding process, using a direct onboarding approach while providing security to the user. In the described solutions and embodiments performed by a singular authentication provider, the user's private keys are not shared with the DApps integrating their software development kit SDK. For example, a user with admin access may not access on-demand cloud computing platforms used to store such encrypted keys, to retrieve a user's private keys.

The different embodiments disclosed show that whenever a blockchain wallet is created, a user is provided with a private key and a public key that is associated with the wallet. The public key is similar to an email address, which may be shared with anyone in order to receive funds. The private key is similar to a password and if compromised can be used to gain controlling access to a wallet. Accordingly, disclosed are methods, in the web3 wallet creation and management industry, to directly onboard users creating a cryptographic wallet that does not expose a user's private key to facilitating third-parties.

FIGS. 1-5 and the following discussion provide a brief, general description of a suitable computing environment in which aspects of the technology described may be implemented. Although not required, aspects of the technology may be described herein in the general context of computer-executable instructions, such as routines executed by a general or special-purpose data processing device (e.g., a server or client computer). Aspects of the technology described herein may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer-implemented instructions, data structures, screen displays, and other data related to the technology may be distributed over the Internet or over other networks (including wireless networks) on a propagated signal on a propagation medium (e.g., an electromagnetic wave, a sound wave, etc.) over a period of time. In some implementations, the data may be provided on any analog or digital network (e.g., packet-switched, circuit-switched, or other scheme).

The described technology may also be practiced in distributed computing environments where tasks or modules are performed by remote processing devices, which are linked through a communications network, such as a Local Area Network ("LAN"), Wide Area Network ("WAN"), or the Internet. In a distributed computing environment, program modules or subroutines may be located in both local and remote memory storage devices. Those skilled in the relevant art will recognize that portions of the described technology may reside on a server computer, while corresponding portions may reside on a client computer (e.g., PC, mobile computer, tablet, or smart phone). Data structures and transmission of data particular to aspects of the technology are also encompassed within the scope of the described technology.

FIG. 1 depicts an exemplary embodiment of a secure web3 key management system 100. The key management system 100 depicts the components and illustrates a functional block diagram of the flow of information as wallet creation and management are processed. Beginning with a user 102 during a wallet creation process, the user 102 interacts with a user's computing device 104, where web3 app 106 and secure web sandbox 108 reside (separately). Based on a request from the user 102, a secure web sandbox 108, via a web3 App 106, may be configured to create a unique wallet or private key. To ensure security and safety of the wallet key, the secure web sandbox 108 encodes the wallet key and splits the wallet key or private key into two separate keys, key A 112 and key B 118.

A Sandbox provides a desktop environment to safely isolate and run applications. Software inside a sandbox environment remains "sandboxed" and runs separately from a host machine. Information stored within a sandbox is temporary and, when closed, all the software, files, and the state are deleted. In some embodiments, the secure web sandbox 108 may split the wallet key into more than two separate keys to increase security and distribution of the necessary keys to reconstruct the wallet key. For example, a third split key may be stored on a local device or a different third-party provider, where further authentication requirements such as a face ID or fingerprint may be used to retrieve it. That is, the disclosed embodiments are not limited to a first key and a second key as the scalable aspect of the invention provides for a system to be configured to use two or more keys where each key is stored a different (two or more) third-party provider.

As referenced in split key storage & encryption component 110, in one embodiment the split keys are distributed separately where key A 112 may be transmitted to a third-party Key Management System (KMS) 114 and key B 118 may be transmitted to a cloud storage 116. The third-party KMS 114 may be configured to provide hardware security module (HSM) key encryption while, cloud storage 116 may be configured to provide cloud encryption-at-rest. The two keys reside separately at the two locations, third-party KMS 114 and cloud storage 116, in these forms, and require retrieval and decryption in order for a web3 transaction to be executed, using the specific user 102 wallet.

In one embodiment, based on receiving a request from a user 102 to perform a web3 transaction using the previously created wallet, the system may be configured to execute the reconstruction of the original wallet key. Referencing the key management system 100, key A 112 and key B 118 are retrieved by the split key storage & encryption component 110 from their respective storage locations and transferred to a Trusted Execution Environment 120. Here in this embodiment, the two keys (key A 112 and key B 118) are used to reconstruct the original wallet key and a requested web3 transaction is signed on behalf of the user 102. The signed transaction 122 may then be returned to the secure web sandbox 108 and broadcast to the blockchain. The disclosed embodiments provide a system where the user's device 104 and the split key storage & encryption component 110 may be in communication with an Authentication Provider 124 for authenticating the user as part of the key management steps.

Figure 2:
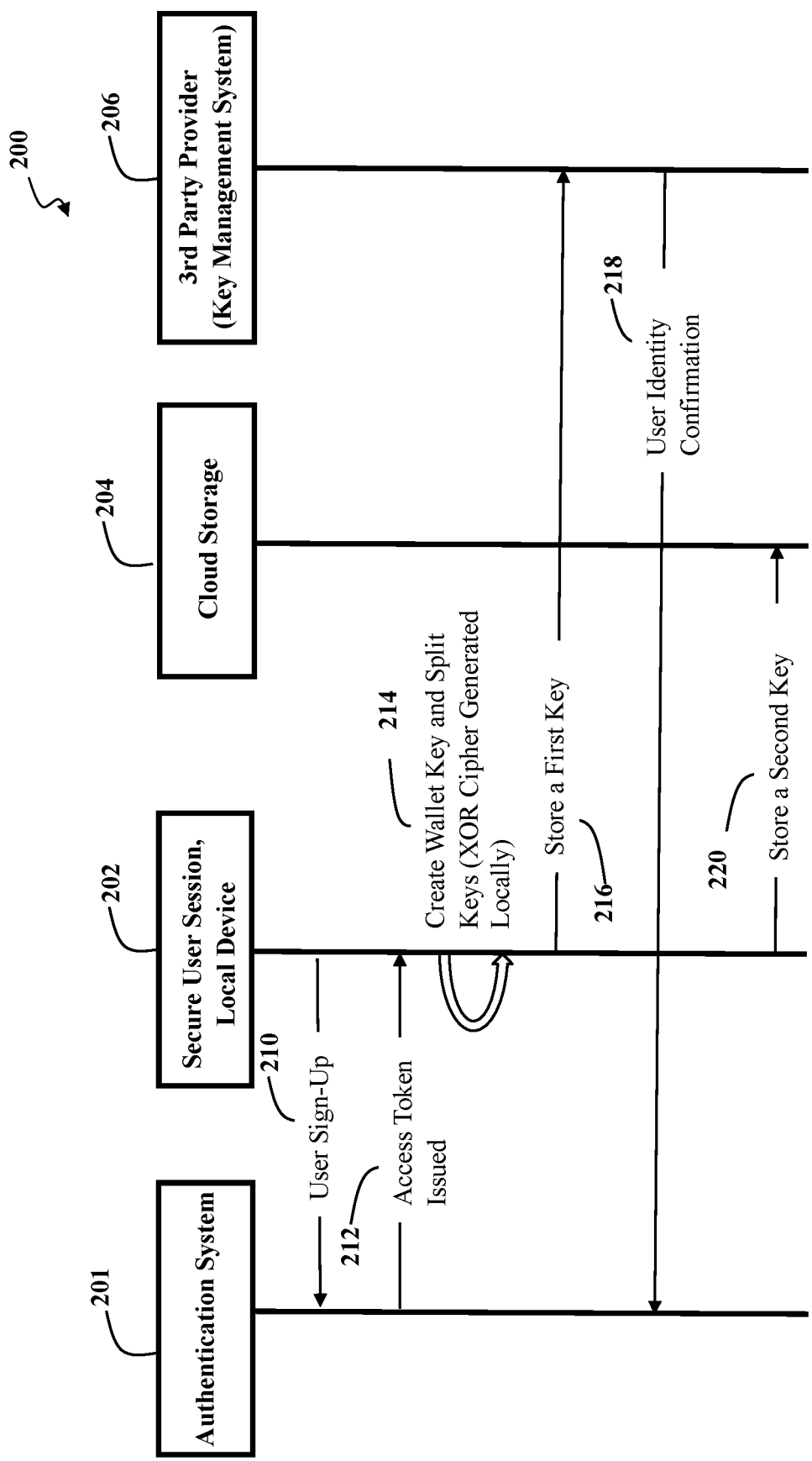
FIG. 2 depicts a data flow of an embodiment of a secure web3 wallet creation process.

FIG. 2 depicts an embodiment of a secure web3 wallet creation process message transfer flow 200 including a third-party authentication system 201 wirelessly connected to a local device 202 running an embodiment of a secure session of the web3 wallet creation and management software. Secure web3 wallet creation process message transfer flow 200 further comprises a cloud storage 204 and a third-party provider 206, where each component may be configured to store and secure encrypted versions of a private or wallet key. Message transfer flow 200 further illustrates the web3 wallet creation process from the perspective of how messages or data is communicated between each component and provides a perspective of message transfer order as well.

Message flow depicted in FIG. 2 begins with a user on a local device 202 engaging in a user sign-up 210. The user sign-up 210 allows a user to provide identifying information which an authentication system 201 stores for future user authentication and login. For security purposes, in some embodiments, the cloud storage 204 may be owned and maintained by a third-party. In another embodiment, the third-party provider 206 may also be kept separate from an authentication provider.

Upon completion of user sign-up 210, a time-limited user access token 212 is generated and issued to the local device 202. The user access token 212 may be used to further decentralize and limit process facilitation steps to a single component.

In one embodiment, a user access token may be a small number of lines of code that contains information about a user, a user's permissions, groups, and timeframes embedded within one token that passes from a server to a user's device. In one example, an access token holds three distinct parts, working together to verify a user's right to access a resource, where the three key elements included in most access tokens are a header, a payload, and a signature. In some embodiments the user access token 212 is generated by a third party.

Upon receipt of a user access token 212 at the local device 202, a new wallet key (or private key) gets created 214 using the local device 202, as well as a public key.

In some embodiments, at the local device 202 the new wallet or private key may be encoded into two separate ciphers or split keys 214. In some embodiments the encoded separate ciphers are of the same size as the original private key via the Randomized Exclusive OR (XOR) Cipher process. Still referencing FIG. 2, one cipher or a first key 216, is sent, by the local device 202, to a third-party provider 206 (using a secure web sandbox 108, FIG. 1), where in some embodiments the first key 216 is stored and encrypted by an individualized Hardware Security Module (HSM) encryption key. A hardware security module (HSM) may include a physical computing device that safeguards and manages digital keys, performs encryption and decryption functions for digital signatures, and performs strong authentication and other cryptographic functions.

Upon receipt of the first key 216, from a local device 202, the third-party provider 206 performs a user identity confirmation 218, where data is compared with identifying information provided to the authentication system 201. Concurrent with the first key 216 being sent to a third-party provider 206, a second key 220 is also sent from a secure web sandbox, running on a secure user session on the local device 202, and stored in the cloud storage 204 where it is further encrypted at-rest. Encryption-at-rest may be described as encryption that is used to help protect data that is stored on a disk (including solid-state drives) or backup media and the data is not actively moving from device to device or network to network.

In some embodiments the cloud storage 204 is controlled by the authentication provider while in other embodiments it may be controlled by a third-party. After a user has completed the secure web3 wallet creation process, the user may participate in, for example, a currency transaction, which requires a secure web3 wallet transaction signature process.

In another embodiment, the secure web3 wallet creation process may incorporate a biometric authentication step for enhanced security. Upon receipt of the user access token 212, the user may be prompted to provide a biometric identifier, such as a fingerprint scan or face ID, which is securely stored on the local device 202. This biometric data may act as an additional layer of verification for future transactions, significantly bolstering the security of the wallet creation process. This biometrically-enhanced process not only ensures that the user is indeed the authorized individual, but also adds a tangible—hard-to-replicate—element to the digital security measures.

In one example, a first user, e.g., user A, may be setting up their secure web3 wallet on their user equipment, e.g., smartphone. During the user sign-up process 210, user A enters their email and creates a password on the local device 202. An access token 212 may then be generated and issued to the smartphone or user A. In the next step, user A may be prompted to provide a biometric identifier—in this case, they opt for a fingerprint scan. Thereafter, the scan is completed successfully, and the biometric data is securely stored on user A's device.

The smartphone of user A may then generate a unique wallet key, which is subsequently encoded into two separate ciphers or split keys 214. One split key 216 may be transmitted to a third-party provider 206, where the key is stored and further encrypted. The other split key 220 may be transmitted to a cloud storage 204, where the key is also securely stored and encrypted.

Accordingly, whenever user A wants to perform a web3 transaction, they will be prompted to authenticate themselves using their fingerprint. This process ensures that only user A, who possesses both the access token and the matching biometric data, is able to use the wallet for transactions, thereby providing an additional layer of security.

Figure 3:
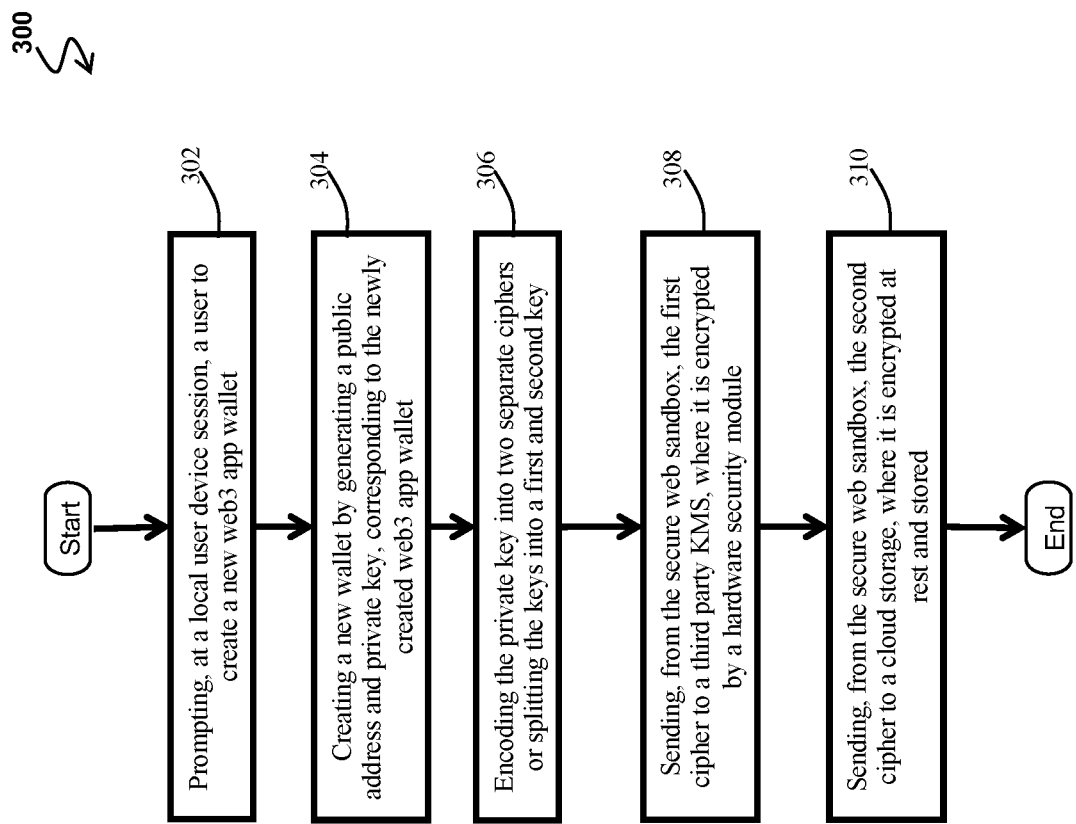
FIG. 3 depicts a process flow chart of a secure web3 wallet creation process.

FIG. 3 depicts an embodiment of the process steps of a secure web3 wallet creation process 300. The secure web3 wallet creation process 300 steps may include: prompting, at a local user device session, a user to create a new web3 app wallet (step 302). After confirmation by a user, the process may continue by creating a new wallet by generating a public address and private key corresponding to the newly created web3 app wallet (step 304). Upon creation of the new wallet and associated keys, the process secures the keys by encoding the private key into two separate ciphers or splitting the keys into a first and second key (step 306). Next, the secure web sandbox sends the first cipher to a third-party Key Management System, where it is encrypted by a Hardware Security Module (step 308). Lastly, secure web3 wallet creation process 300, sends, via the secure web sandbox, the second cipher to a cloud storage where it is encrypted at-rest and stored (step 310).

Figure 4:
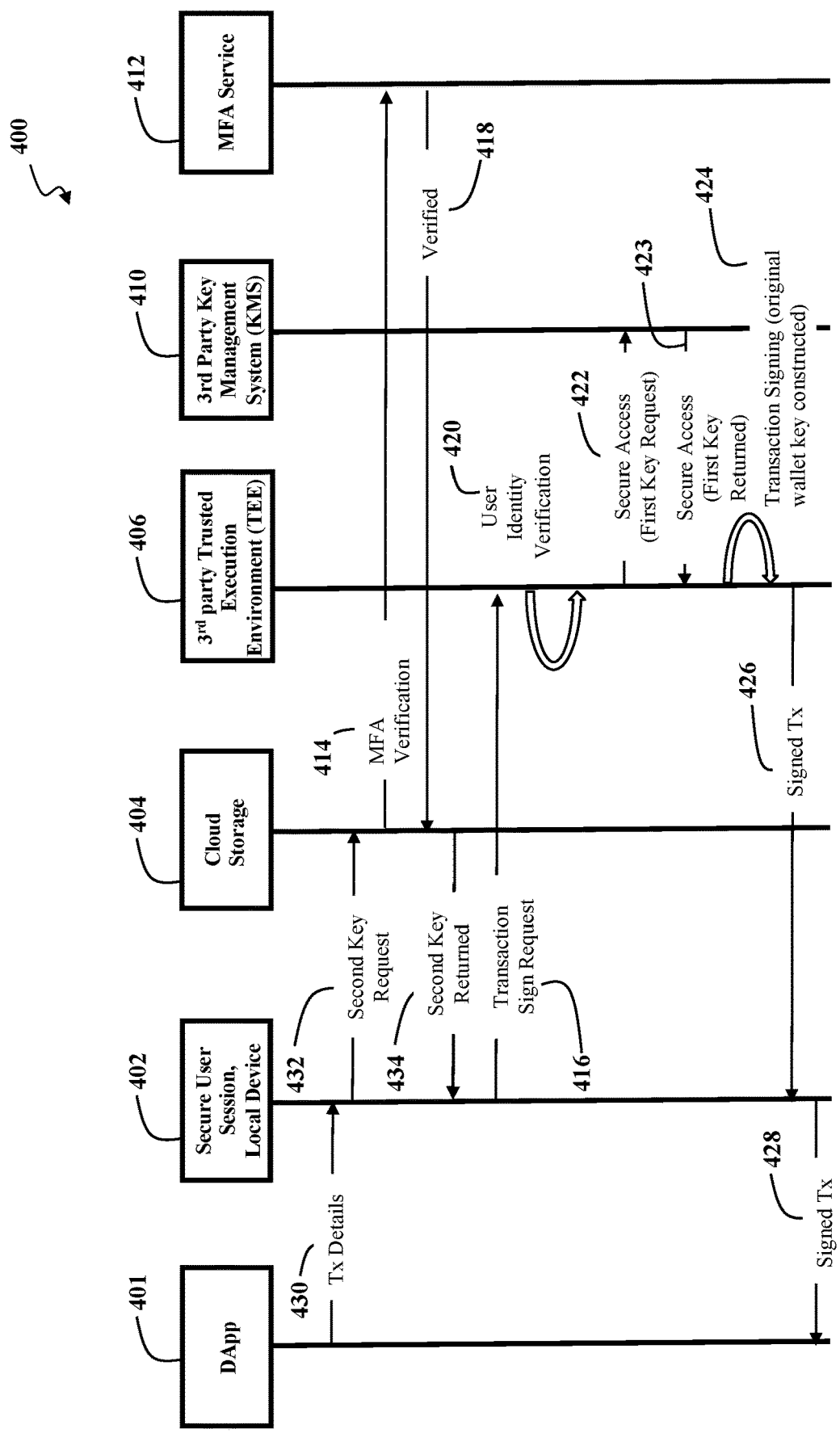
FIG. 4 depicts a data flow of an embodiment of a secure web3 wallet transaction signing process.

Referring to FIG. 4, an embodiment of a message transfer flow of a secure web3 wallet transaction signing process 400 is illustrated. The web3 wallet transaction signing process 400 includes several components: the Decentralized Application (DApp) 401, which interfaces with the current system and initiates the transaction process, acting as the starting point for transaction requests; a secure user session 402 running on a local device, serving as the secure environment for user interaction with the system, managing the input and output of transaction details, and handling the user's transaction requests; a cloud storage 404 that securely stores the split keys and retrieves them upon authenticated requests, thus ensuring the overall security of the key management process; the Trusted Execution Environment (TEE) 406 that provides an isolated and secure environment for the execution of sensitive operations, such as the recombination of split keys and the signing of transactions, ensuring the confidentiality and integrity of these processes; a third-party Key Management System or Server (KMS) 410 that securely stores one part of the split key and delivers the stored split key upon validated requests, playing a role in maintaining the security of the split key; and, the Multi-Factor Authentication (MFA) service 412 that verifies the user's identity, ensuring only authorized users initiate and execute transactions, adding an extra layer of security by authenticating the user before allowing access to the split keys. These components collectively enable the secure, authenticated, and verified web3 transactions, each playing a distinct role in the distributed system and process.

In one embodiment, the method components may include a DApp utilizing an embodiment of the current system, connected wirelessly or on a wired LAN, to a secure user session being run on a local device 402, and communicating via one or more data transmission protocols, for example, Secure Sockets Layer (SSL), with the other components: the cloud storage 404, the Trusted Execution Environment (TEE) 406, the third-party KMS 410, and the Multi-Factor Authentication (MFA) service 412—as described in more detail herein.

As previously mentioned, after a user wallet has successfully been created, a user may use that wallet to participate in web3 transactions such as an exchange of funds with another participating party. To facilitate this transaction, an original wallet key must be reconstructed using the two previously distributed split keys.

An initial step in this process may first include transaction details 430 being transferred from a DApp 401 to a secure user session (or "sandbox") being executed on a local device 402. Upon receipt of the transaction details 430 at the local device 402, a request is made to the cloud storage 404 for a previously split and stored second key 432. The second key is then retrieved 434 and stored on the user device 402. To facilitate the request, the cloud storage 404—using multi-factor verification 414 methods—may transmit a request to the MFA service 412. In some embodiments, the MFA service 412 may be owned and/or controlled by the authentication provider while in other embodiments it may be owned and/or controlled by a third-party entity. If successfully authenticated, a verification message 418 may be transmitted by the MFA service 412, back to cloud storage 404. Upon receipt of the verification message 418, the cloud storage 404 decrypts and returns the second key 434 to the local device 402. At this point the local device 402 may transmit a transaction sign request 416 to the Trusted Execution Environment 406, along with the transaction details 430, the second key 432, and other detailed data included as part of a user access token.

A trusted execution environment (TEE) is an isolated execution environment that provides security features such as isolated execution, integrity of applications executing with the TEE, and offers an execution space that provides a higher level of security for trusted applications running on the device. The TEE is a popular method of securing the data being processed, which is required in sensitive/high value data processing environments, such as health care, PIIS and financial data. The use of the TEE for the transaction signing process means the user's wallet key, as well as all the information necessary to reconstruct the key, never leaves the secure environment. In one embodiment, the TEE may be an area on a connected third-party device providing an isolated processing environment in which applications may be securely executed irrespective of the rest of the system, or a secure area on the main processor of a device that is separated from the system's main operating system (OS).

Within the secure third-party Trusted Execution Environment (TEE) 406, a Transaction Sign Function (TSF) may be activated upon receipt of the transaction sign request 416 and associated data. The TSF may then verify the user's identity 420 using the user's access token. After verification of the user, the TSF requests a first key 422 via secure access from the third-party KMS 410, where secure access may be an access control service with authentication, providing an additional layer of security to Internet facing web applications. KMS 410, in response, sends the first key 423 to the TSF where at this point, all necessary components to reconstruct the original key, have been retrieved. Within the TEE 406 reconstruction of the original private key or wallet key, from the first and second keys is executed, allowing the TEE 406 to further sign the transaction details 424 with the private key, and return the signed bytes 426 to a local device 402. Finally, the signed transaction details 428 are transferred to the original DApp 401 for broadcast to a blockchain.

Figure 5A:
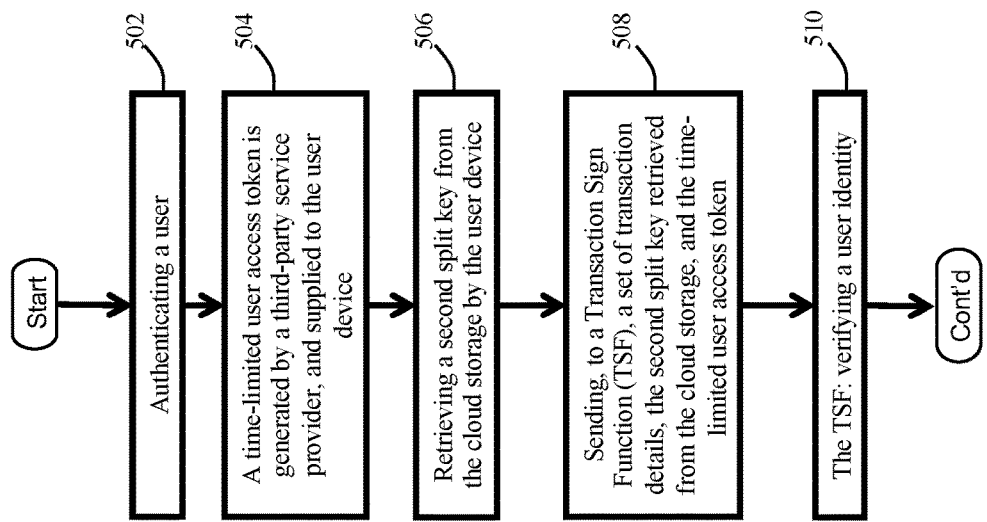
FIGS. 5A-5B depict a process flow chart of a secure web3 wallet transaction signing process.
Figure 5B:
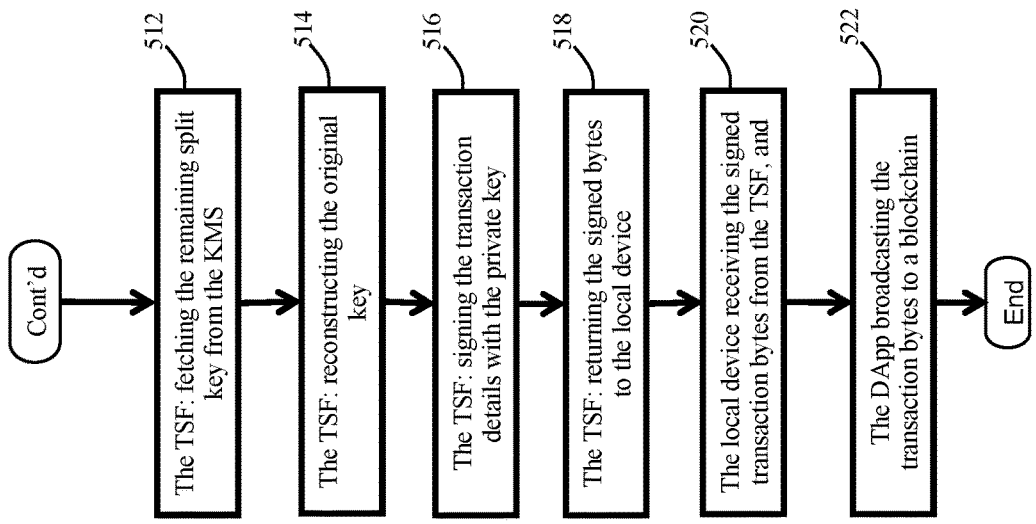

FIGS. 5A-5B illustrate an embodiment of a secure web3 wallet transaction signing process 500. The process begins with authenticating a user (step 502); this may be the first step to ensure the security of the subsequent operations. Once the user is authenticated, a time-limited user access token is generated by a third-party service provider and transmitted to the user device (step 504), providing an added layer of security for the process.

The user device then retrieves a second split key from the cloud storage (step 506). The second split key, along with the transaction details, and the user access token, are then sent to a Transaction Sign Function (TSF) (step 508). The TSF, residing in a secure Trusted Execution Environment (TEE), ensures that computational tasks are performed in an isolated, high-security environment. Within the TEE, the TSF verifies the user's identity (step 510), leveraging the user access token (from step 504.)

Upon successful verification, the TSF fetches the remaining split key from the Key Management System (KMS) (step 512). With both split keys now available, the TSF reconstructs the original key (step 514).

The TSF then signs the transaction details with the private key (step 516), generating a secure signature that validates the transaction. The signed transaction bytes, a cryptographic representation of the transaction, are then returned to the user device (step 518).

Upon receiving the signed transaction bytes from the TSF, the user device (step 520) then transfers these bytes to the original Decentralized Application (DApp). Finally, the DApp broadcasts the signed transaction bytes to the blockchain (step 522), completing the transaction and recording it on the immutable ledger.

Figure 6:
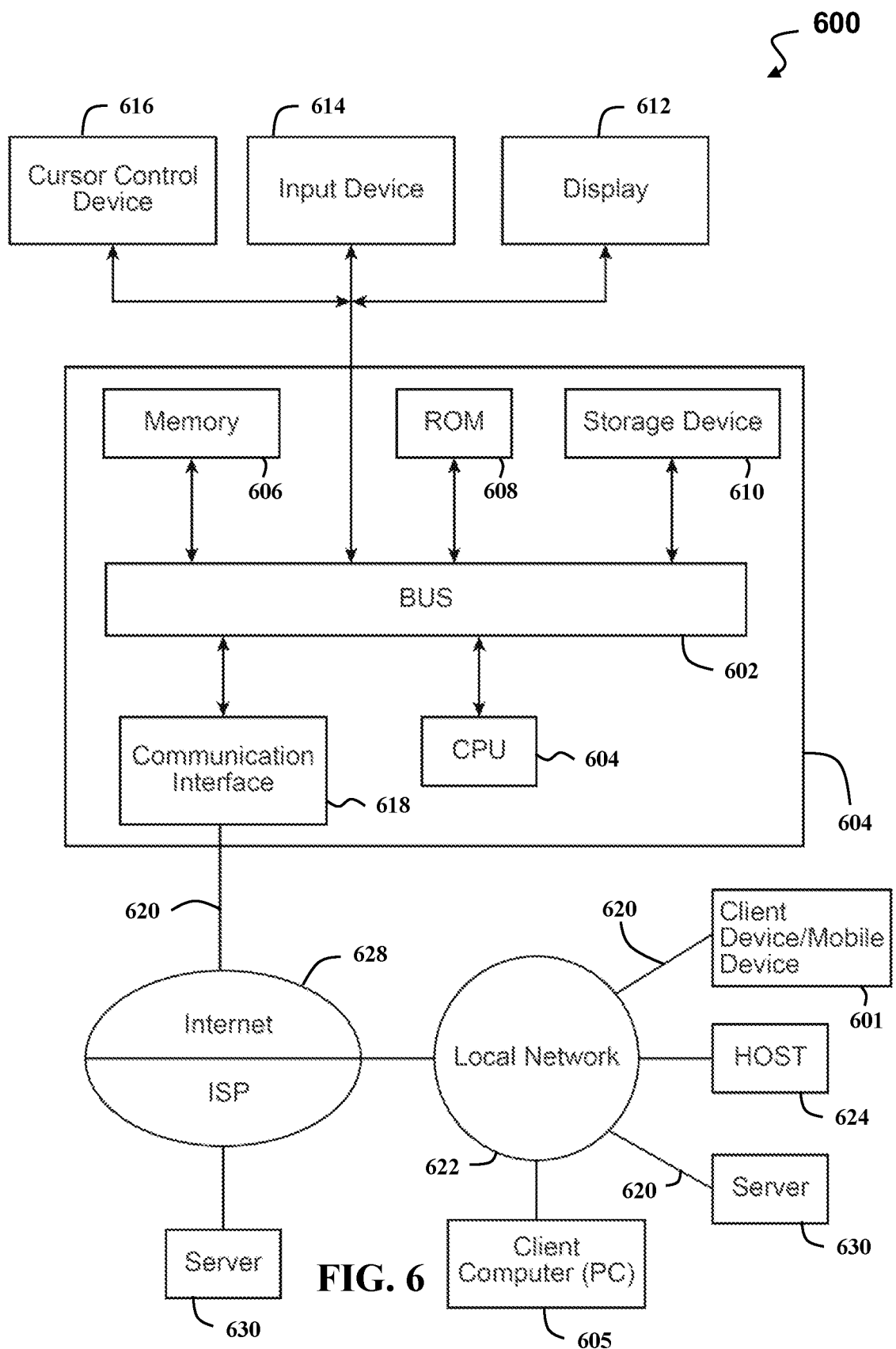
FIG. 6 shows a block diagram of an example system in which an embodiment may be implemented.

FIG. 6 shows a block diagram of an example system 600 in which an embodiment may be implemented. The system 600 includes one or more client devices 601 such as consumer electronics devices, connected to one or more server computing systems 630. A server 630 includes a bus 602 or other communication mechanism for communicating information, and a processor (CPU) 604 coupled with the bus 602 for processing information. The server 630 also includes a main memory 606, such as a random access memory (RAM) or other dynamic storage device, coupled to the bus 602 for storing information and instructions to be executed by the processor 604. The main memory 606 also may be used for storing temporary variables or other intermediate information during execution or instructions to be executed by the processor 604. The server computer system 630 further includes a read only memory (ROM) 608 or other static storage device coupled to the bus 602 for storing static information and instructions for the processor 604. A storage device 610, such as a magnetic disk or optical disk, is provided and coupled to the bus 602 for storing information and instructions. The bus 602 may contain, for example, thirty-two address lines for addressing video memory or main memory 606. The bus 602 can also include, for example, a 32-bit data bus for transferring data between and among the components, such as the CPU 604, the main memory 606, video memory and the storage 610. Alternatively, multiplex data/address lines may be used instead of separate data and address lines.

The server 630 may be coupled via the bus 602 to a display 612 for displaying information to a computer user. An input device 614, including alphanumeric and other keys, is coupled to the bus 602 for communicating information and command selections to the processor 604. Another type or user input device comprises cursor control 616, such as a mouse, a trackball, or cursor direction keys for communicating direction information and command selections to the processor 604 and for controlling cursor movement on the display 612.

According to one embodiment, the functions are performed by the processor 604 executing one or more sequences of one or more instructions contained in the main memory 606. Such instructions may be read into the main memory 606 from another computer-readable medium, such as the storage device 610. Execution of the sequences of instructions contained in the main memory 606 causes the processor 604 to perform the process steps described herein. One or more processors in a multi-processing arrangement may also be employed to execute the sequences of instructions contained in the main memory 606. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 604 for execution. Such a medium may take many forms, including but not limited to, non-volatile media, volatile media, and transmission media. Non-volatile media includes, for example, optical or magnetic disks, such as the storage device 610. Volatile media includes dynamic memory, such as the main memory 606. Transmission media includes coaxial cables, copper wire and fiber optics, including the wires that comprise the bus 602. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 604 for execution. For example, the instructions may initially be carried on a magnetic disk of a remote computer. The remote computer can load the instructions into its dynamic memory and send the instructions over a telephone line using a modem. A modem local to the server 630 can receive the data on the telephone line and use an infrared transmitter to convert the data to an infrared signal. An infrared detector coupled to the bus 602 can receive the data carried in the infrared signal and place the data on the bus 602. The bus 602 carries the data to the main memory 606, from which the processor 604 retrieves and executes the instructions. The instructions received from the main memory 606 may optionally be stored on the storage device 610 either before or after execution by the processor 604.

The server 630 also includes a communication interface 618 coupled to the bus 602. The communication interface 618 provides a two-way data communication coupling to a network link 620 that is connected to the world wide packet data communication network now commonly referred to as the Internet 628. The Internet 628 uses electrical, electromagnetic or optical signals that carry digital data streams. The signals through the various networks and the signals on the network link 620 and through the communication interface 618, which carry the digital data to and from the server 630, are exemplary forms or carrier waves transporting the information.

In another embodiment of the server 630, interface 618 is connected to a network 622 via a communication link 620. For example, the communication interface 618 may be an integrated services digital network (ISDN) card or a modem to provide a data communication connection to a corresponding type of telephone line, which can comprise part of the network link 620. As another example, the communication interface 618 may be a local area network (LAN) card to provide a data communication connection to a compatible LAN. Wireless links may also be implemented. In any such implementation, the communication interface 618 sends and receives electrical electromagnetic or optical signals that carry digital data streams representing various types of information.

The network link 620 typically provides data communication through one or more networks to other data devices. For example, the network link 620 may provide a connection through the local network 622 to a host computer 624 or to data equipment operated by an Internet Service Provider (ISP). The ISP in turn provides data communication services through the Internet 628. The local network 622 and the Internet 628 both use electrical, electromagnetic or optical signals that carry digital data streams. The signals through the various networks and the signals on the network link 620 and through the communication interface 618, which carry the digital data to and from the server 630, are exemplary forms or carrier waves transporting the information.

The server 630 can send/receive messages and data, including e-mail, program code, through the network, the network link 620 and the communication interface 618. Further, the communication interface 618 can comprise a USB/Tuner and the network link 620 may be an antenna or cable for connecting the server 630 to a cable provider, satellite provider or other terrestrial transmission system for receiving messages, data and program code from another source.

The example versions of the embodiments described herein may be implemented as logical operations in a distributed processing system such as the system 600 including the servers 630. The logical operations of the embodiments may be implemented as a sequence of steps executing in the server 630, and as interconnected machine modules within the system 600. The implementation is a matter of choice and can depend on performance of the system 600 implementing the embodiments. As such, the logical operations constituting said example versions of the embodiments are referred to for e.g., as operations, steps or modules.

Similar to a server 630 described above, a client device 601 can include a processor, memory, storage device, display, input device and communication interface (e.g., e-mail interface) for connecting the client device to the Internet 628, the ISP, or LAN 622, for communication with the servers 630. The system 600 can further include computers (e.g., personal computers, computing nodes) 605 operating in the same manner as client devices 601, where a user can utilize one or more computers 605 to manage data in the server 630.

Figure 7:
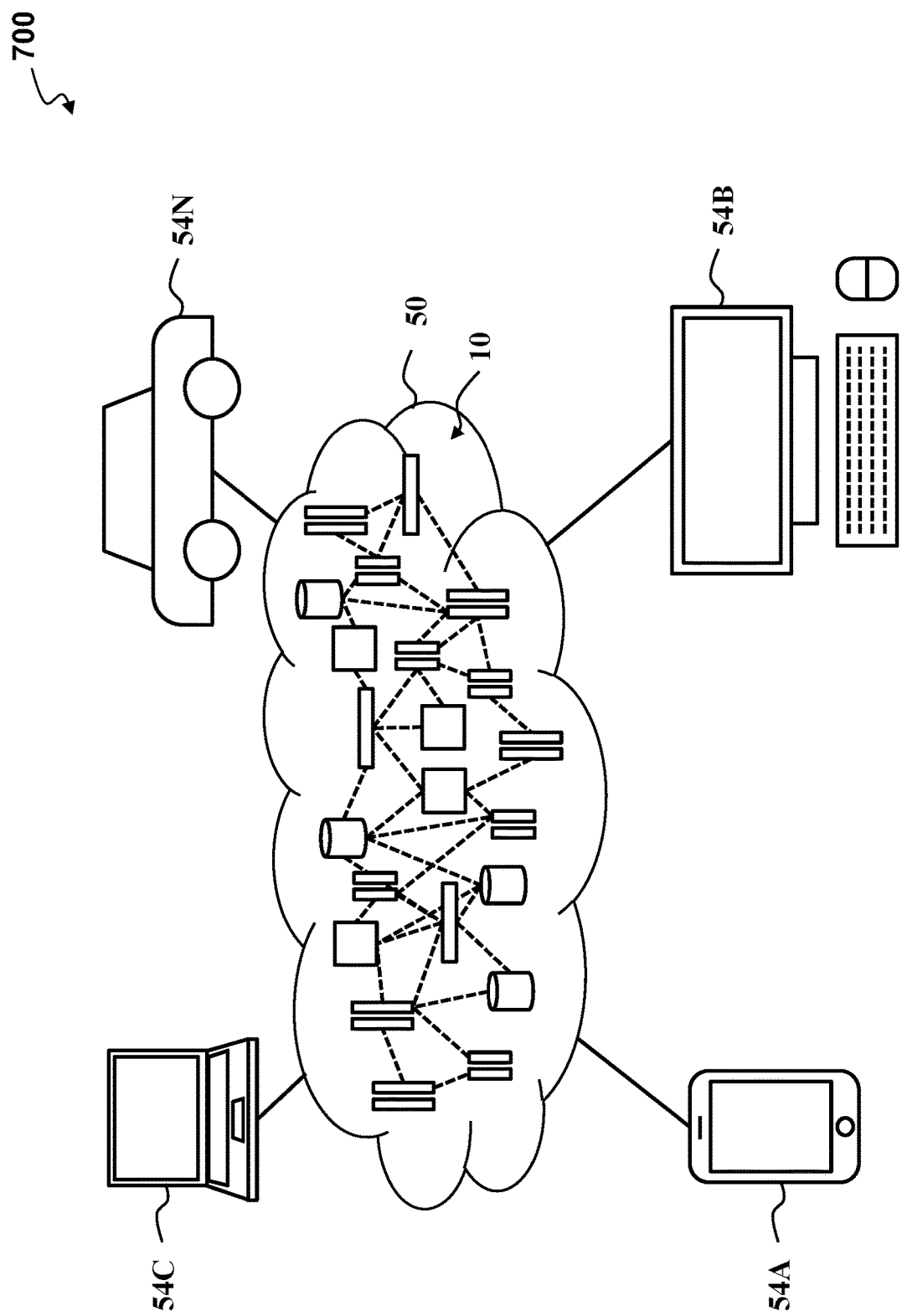
FIG. 7 depicts an illustrative cloud computing environment, according to one embodiment.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA), smartphone, smart watch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
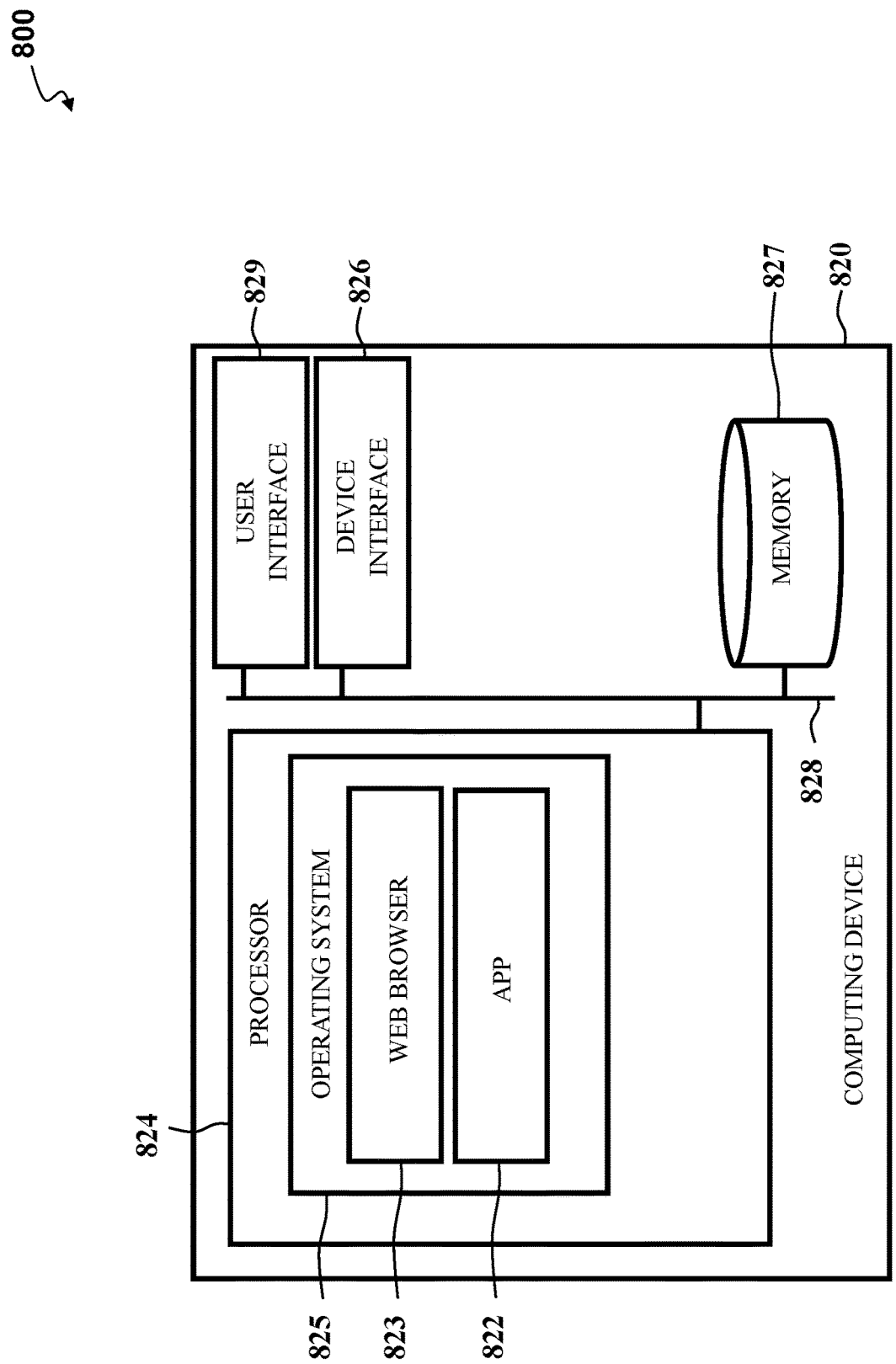
FIG. 8 depicts a top-level functional block diagram of a computing device embodiment.

FIG. 8 illustrates an example of a top-level functional block diagram of a computing device embodiment 800. The example operating environment is shown as a computing device 820 comprising a processor 824, such as a central processing unit (CPU), addressable memory 827, an external device interface 826, e.g., an optional universal serial bus port and related processing, and/or an Ethernet port and related processing, and an optional user interface 829, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 820, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 828. In some embodiments, via an operating system 825 such as one supporting a web browser 823 and applications 822, the processor 824 may be configured to execute steps of a process establishing a communication channel and processing according to the embodiments described above.

Figure 9:
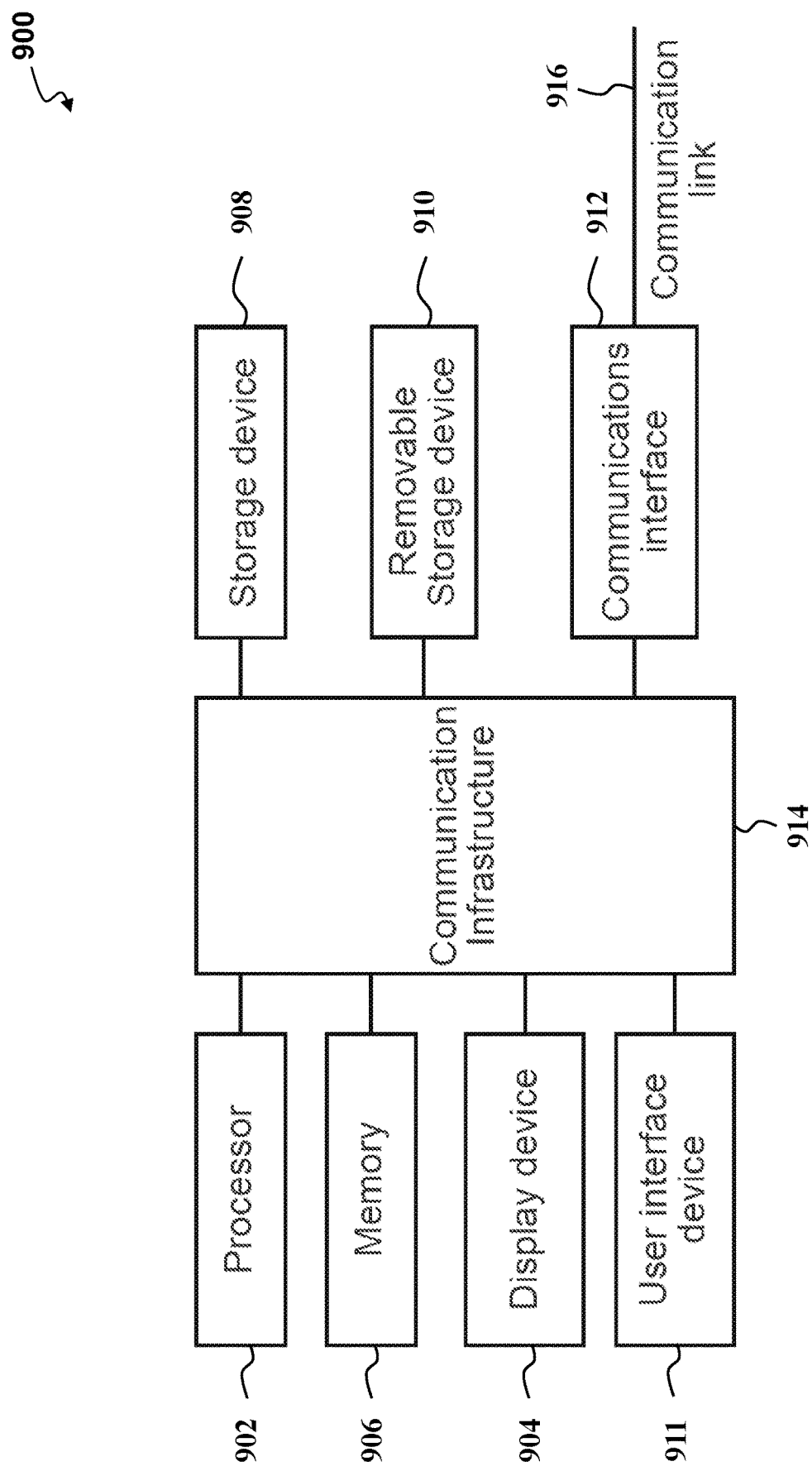
FIG. 9 is a high-level block diagram showing a computing system comprising a computer system useful for implementing an embodiment of the system and process, according to one embodiment.

FIG. 9 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer readable medium having stored therein computer software and/or data), user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected as shown.

Information transferred via communications interface 914 may be in the form of signals such as electronic, electromagnetic, optical, or other signals capable of being received by communications interface 914, via a communication link 916 that carries signals and may be implemented using wire or cable, fiber optics, a phone line, a cellular/mobile phone link, an radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer implemented process.

Embodiments have been described with reference to flowchart illustrations and/or block diagrams of methods, apparatus (systems) and computer program products according to embodiments. Each block of such illustrations/diagrams, or combinations thereof, can be implemented by computer program instructions. The computer program instructions when provided to a processor produce a machine, such that the instructions, which execute via the processor, create means for implementing the functions/operations specified in the flowchart and/or block diagram. Each block in the flowchart/block diagrams may represent a hardware and/or software module or logic, implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
a cloud storage device;
a secure third-party trusted execution environment;
a third-party provider; and
a user computing device having a processor and addressable memory, the user computing device in communication with the cloud storage device having a processor and addressable memory, the secure third-party trusted execution environment having a processor and addressable memory, and the third-party provider;
wherein the user computing device is configured to:
determine, via a Secure Web Sandbox being executed on the user computing device, a private key and a public key based on receiving a request from a user to create a digital wallet;
encrypt the determined private key into a plurality of separate keys, wherein the plurality of separate keys are split via encoding the private key into a first key and a second key;
transmit the first key to a third party provider; transmit the
second key to a cloud storage device; and
wherein the cloud storage device is configured to:
encrypt the second key via cloud encryption-at-rest;
store the encrypted second key for future retrieval and decryption; wherein the third party provider is a key management system configured to:
encrypt the first key via an individualized hardware security module encryption key; and
store the encrypted first key for future retrieval and decryption; wherein the cloud storage device is further configured to:
perform a multi-factor authentication verification based on a received request from the user computing device for the second key;
decrypt the second key based on a successful authentication, wherein the authentication is determined to be successful by a multi-factor authentication service;
transmit the decrypted second key to the user computing device;
wherein the user computing device is further configured to:
transmit a transaction sign request to the trusted execution environment wherein the request comprises transaction details and the decrypted second key;
wherein the trusted execution environment is further configured to:
perform a user identity verification;
transmit, if the user identify verification is successful, a request to the third-party provider for the first key via a secure access;
perform reconstruction of the original private key based on the first key received from the third-party provider and the second key received from the cloud storage device;
sign a digital wallet transaction based on the reconstructed original private key; and
return the signed digital wallet transaction to the user computing device; and
wherein the user computing device is further configured to: broadcast the signed transaction details, via a decentralized
application, to a blockchain.

2. The system of claim 1 further comprising an authentication system configured to provide an additional step of authenticating the user as part of the key management system.

3. The system of claim 2, wherein the third-party provider is further configured to determine a user identity confirmation via the authentication system.

4. The system of claim 1, wherein the multi-factor authentication service is controlled by at least one of: an authentication provider of an authentication system and a third-party entity.

5. The system of claim 1, wherein each key of the plurality of separate keys is stored in a different location.

6. The system of claim 1, wherein the user identity verification is further performed using an access token associated with the user, wherein the access token is a time-limited user access token.

7. The system of claim 1, wherein the private key is a password.

8. The system of claim 1, wherein the plurality of separate keys are split via encoding the private key into a first key, a second key, and a third key.

9. The system of claim 8, wherein the third key is stored on at least one of: a local device and a different third-party provider.

10. The system of claim 1, wherein biometric data is used as further authentication requirements to retrieve the first key or the second key.

11. A method comprising:
determining, by a user computing device having a processor and addressable memory, a private key and a public key based on receiving a request from a user to create a digital wallet;
encrypting, by the user computing device, the determined private key into a plurality of separate keys, wherein the plurality of separate keys are split via encoding the private key into a first key and a second key;

transmitting, by the user computing device, the first key to a third-party provider having a processor and addressable memory;
transmitting, by the user computing device, the second key to a cloud storage device having a processor and addressable memory;
encrypting, by the third-party provider executing a key management system, the first key;
storing, by the third-party provider executing the key management system, the encrypted first key for future retrieval and decryption;
encrypting, by the cloud storage device, the second key via cloud encryption-at-rest;
storing, by the cloud storage device, the encrypted second key for future retrieval and decryption;
performing, by the cloud storage device, a multi-factor authentication verification based on a received request from the user computing device for the second key;
decrypting, by the cloud storage device, the second key based on a successful authentication;
transmitting, by the cloud storage device, the decrypted second key to the user computing device;
transmitting, by the user computing device, a transaction sign request to a secure third-party trusted execution environment having a processor and addressable memory, wherein the request comprises transaction details and the decrypted second key;
performing, by the trusted execution environment, a user identity verification;
transmitting, by the trusted execution environment, if the user identify verification is successful, a request to the third-party provider for the first key;
performing, by the trusted execution environment, reconstruction of the original private key based on the first key received from the third-party provider and the second key received from the cloud storage device;
signing, by the trusted execution environment, a digital wallet transaction based on the reconstructed original private key;
returning, by the trusted execution environment, the signed digital wallet transaction to the user computing device; and
broadcasting, by the user computing device, the signed transaction details to a blockchain.

12. The method of claim 11, wherein the user computing device is in communication with the cloud storage device, the secure third-party trusted execution environment, and the third-party provider.

13. The method of claim 11, wherein transmitting, if the user identify verification is successful, a request to the third-party provider for the first key via a secure access.

14. The method of claim 11, wherein determining a private key and a public key is via a Secure Web Sandbox being executed on the user computing device.

15. The method of claim 11, wherein encrypting the first key is via an individualized hardware security module encryption key.

16. The method of claim 11, wherein a successful authentication is determined to be successful by a multi-factor authentication service.

17. The method of claim 11, wherein broadcasting the signed transaction details is via a decentralized application.

* * * * *